(12) United States Patent
Kim et al.

(10) Patent No.: US 8,386,215 B2
(45) Date of Patent: Feb. 26, 2013

(54) METHOD AND APPARATUS FOR RADIO PROPAGATION MODELING USING RAY-TRACING METHOD

(75) Inventors: Jong Ho Kim, Daejeon (KR); Young Keun Yoon, Cheongju (KR); Heon Jin Hong, Daejeon (KR); Chang-Joo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 429 days.

(21) Appl. No.: 12/599,992

(22) PCT Filed: Feb. 27, 2008

(86) PCT No.: PCT/KR2008/001132
§ 371 (c)(1),
(2), (4) Date: Nov. 13, 2009

(87) PCT Pub. No.: WO2008/147025
PCT Pub. Date: Dec. 4, 2008

(65) Prior Publication Data
US 2010/0250221 A1    Sep. 30, 2010

(30) Foreign Application Priority Data
May 30, 2007  (KR) .................. 10-2007-0052869

(51) Int. Cl.
*G06F 17/50* (2006.01)

(52) U.S. Cl. .................. 703/2; 703/13; 703/17
(58) Field of Classification Search ............... 703/2, 14, 703/13, 17; 342/260, 359; 345/349
See application file for complete search history.

(56) References Cited

U.S. PATENT DOCUMENTS

| | | | |
|---|---|---|---|
| 5,301,127 A * | 4/1994 | Hitney | 342/26 D |
| 5,574,466 A * | 11/1996 | Reed et al. | 342/359 |
| 5,689,812 A * | 11/1997 | Takahashi | 455/67.16 |
| 7,519,136 B2 * | 4/2009 | Qi et al. | 375/349 |
| 2005/0281363 A1 * | 12/2005 | Qi et al. | 375/349 |

FOREIGN PATENT DOCUMENTS
KR    10-2002-0054016 A    7/2002

OTHER PUBLICATIONS

Ming Liang et al., 'A Practical Radiosity Method for Predicting Transmission Loss in Urban Environments',EURASIP Journal on Wireless Communications and Networking, Feb. 2004, pp. 357-364.
International Search Report and Written Opinion for PCT/KR2008/001132.

* cited by examiner

*Primary Examiner* — Thai Phan
(74) *Attorney, Agent, or Firm* — LRK Patent Law Firm (57) ABSTRACT

A method and apparatus for modeling radio propagation is provided. In the method, when a wall having a thickness is modeled as a line having no thickness, an error in a shade area is minimized by considering the thickness of a wall while maintaining simplicity in a ray-tracing method.

6 Claims, 6 Drawing Sheets

FIG. 6

METHOD AND APPARATUS FOR RADIO PROPAGATION MODELING USING RAY-TRACING METHOD

CROSS-REFERENCE TO RELATED PATENT APPLICATIONS

This application claims the benefit of Korean Patent Application No. 10-2007-0052869, filed on May 30, 2007, in the Korean Intellectual Property Office, the disclosure of which is incorporated herein in its entirety by reference.

BACKGROUND OF THE INVENTION

1. Field of the Invention

The present invention relates to a method and apparatus for radio propagation modeling, and more particularly, to a method and apparatus for radio propagation modeling which can minimize an error due to a shade area generated when a wall having a thickness is processed as a line having no thickness, for easy and quick calculation, in a ray-tracing propagation model.

The present invention was supported by the Information Technology (IT) Research & Development (R&D) program of the Ministry of Information and Communication (MIC) and the Institute for Information Technology Advancement (IITA), Republic of Korea. [Project No. 2005-5-046-03, Project Title: Development of the basic spectrum resource utilizing technology].

2. Description of the Related Art

A method of predicting and modeling radio propagation includes a statistic method using measurement results in a wide range and a theoretical approach method. A ray-tracing method belongs to the theoretical approach method and can predict radio propagation more accurately than other methods. This method needs too long of a calculation time for prediction and thus has not used much in the past. However, with the recent development in computing capacity and continuous studies thereon, the calculation time in a limited area can be much reduced.

When radio propagation is modeled using a ray-tracing method, a shade area is generated by a wall or obstacle. In the shade area, there is no path through which a radio wave can directly propagate and propagation loss is great due to diffraction or diffusion.

When radio propagation is predicted using the ray-tracing method, a reflection object or obstacle located on a propagation path is mathematically represented as simple as possible to reduce the amount of calculations. In particular, for a wall, the thickness of the wall is omitted and the complexity of calculations is avoided by processing a two-dimensional wall as a line and a tree-dimensional wall as a surface. However, such simplification results in an area, corresponding to an actual shade area, be represented as an area that is not the shade area, and thus, an error of the propagation loss according thereto cannot be neglected.

To address the above problem, according to conventional technology, the difference from the actual case is neglected so that a calculation speed is increased while sacrificing accuracy. In contrast, even though accuracy is not sacrificed by considering the thickness of a wall, the calculation speed is decreased.

SUMMARY OF THE INVENTION

To solve the above and/or other problems, the present invention provides a method and apparatus for radio propagation modeling which can minimize an error due to a shade area while maintaining the simplicity of a ray-tracing method in which a wall having a thickness is processed as a line having no thickness.

The other purpose and advantages of the present invention can be more clearly understood by an embodiment of the present invention. Also, it can be easily understood that the purpose and advantages of the present invention is implemented by the means defined in claims and a combination thereof.

According to an aspect of the present invention, there is provided a radio propagation modeling method using a ray-tracing method comprises determining the position of a transmitter with respect to an obstacle in a radio propagation modeling area, predicting a shade area, generated by a radio wave output from the transmitter, and a horizontal linear length of the obstacle, and correcting the shade area considering the thickness of the obstacle.

According to another aspect of the present invention, there is provided a radio propagation modeling apparatus using a ray-tracing method comprises a position determination portion determining the position of a transmitter with respect to an obstacle in a radio propagation modeling area, a radio propagation tracing portion predicting a shade area, generated by a radio wave output from the transmitter, and a horizontal linear length of the obstacle, and a correction portion correcting the shade area considering the thickness of the obstacle.

According to another aspect of the present invention, there is provided a computer readable recording medium having recorded thereon a program for executing the radio propagation modeling method by using a computer.

BRIEF DESCRIPTION OF THE DRAWINGS

The above and other features and advantages of the present invention will become more apparent by describing in detail embodiments thereof with reference to the attached drawings in which.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth herein: rather, these embodiments are provided so that this disclosure will be thorough and complete, and will fully convey the concept of the invention to those skilled in the art. In the drawings, the thicknesses of layers and regions are exaggerated for clarity.

Also, when a part "includes" or "comprises" an element, unless there is a particular description contrary thereto, the part can further include other elements, not excluding the other elements.

Figure 1:
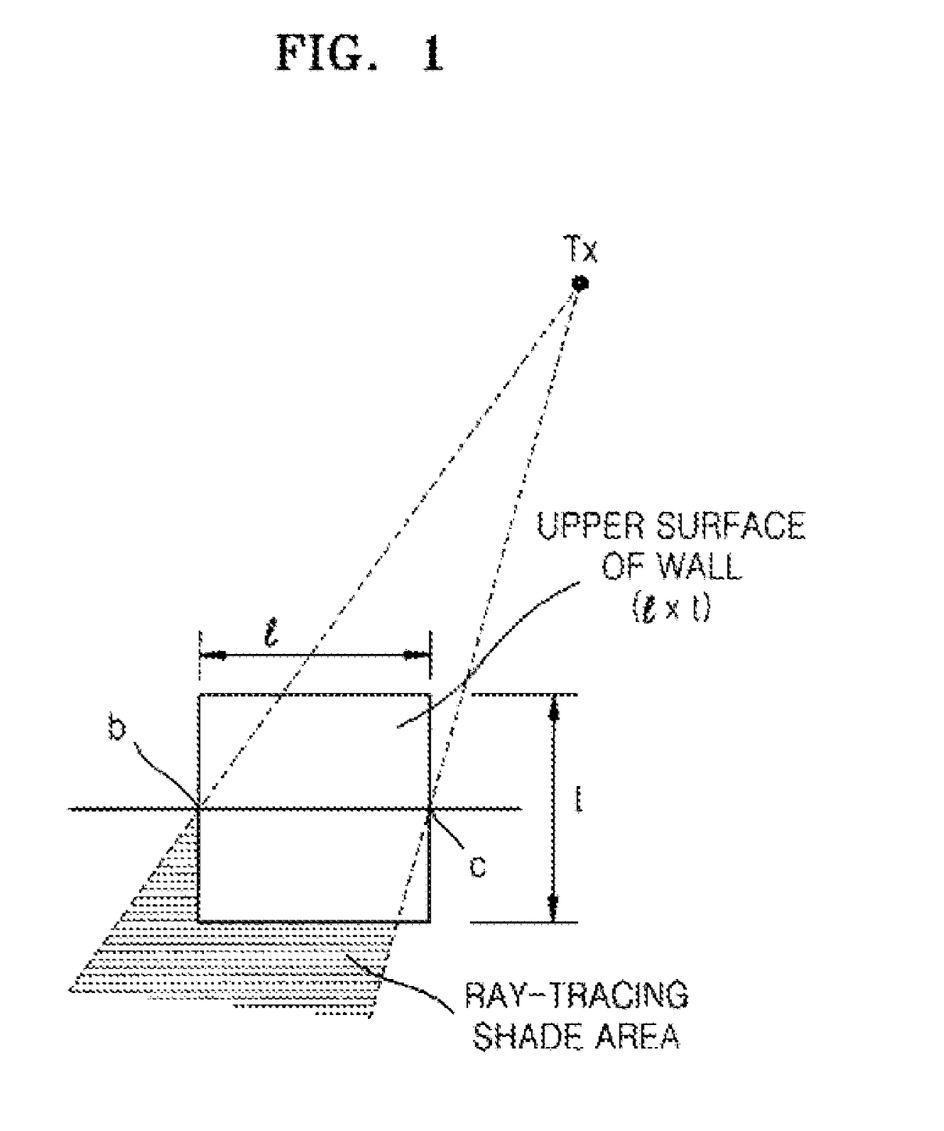
FIG. 1 illustrates a shade area generated by an obstacle (wall) modeled as a one-dimensional line with a transmitter in the conventional ray-tracing method.

FIG. 1 illustrates a shade area generated by an obstacle (wall) modeled as a one-dimensional line with a transmitter in the conventional ray-tracing method. Referring to FIG. 1, for an obstacle, in particular, a wall, existing on a propagation path of a radio wave output from a transmitter Tx, radio modeling is performed on a shade area, generated by the obstacle modeled as a line having a length l in a horizontal direction of the wall while disregarding the thickness t of the wall. The difference in the shade areas can vary not only due to the thickness of the obstacle but also due to the relative position of the obstacle and the transmitter.

However, the conventional ray-tracing method has a great propagation loss because accuracy is degraded. Thus, in the conventional ray-tracing method, there is a need to correct a ray-tracing shade area resulting from the length of the wall, maintain the accuracy and increase the calculation speed by minimizing the difference in the shade area generated according to the thickness of the wall.

Figure 2:
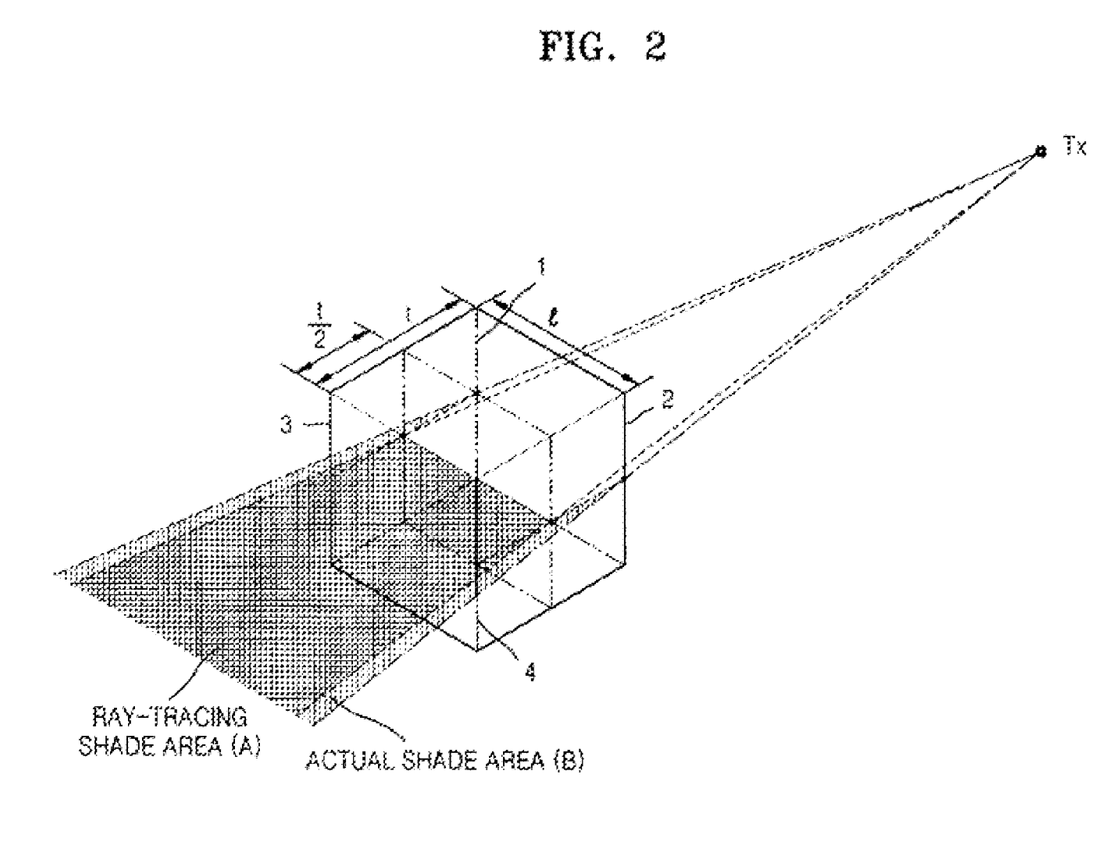
FIG. 2 is a perspective view of an actual shade area generated using a ray-tracing method considering the thickness of an obstacle (wall), according to an embodiment of the present invention.

FIG. 2 is a perspective view showing a shade area generated by an obstacle when the transmitter Tx transmits a radio wave when considering the thickness of the obstacle and not considering the thickness of the obstacle. Referring to FIG. 2, when the thickness t of a wall is not considered, a shade area A appears on a propagation path only due to the length l of the wall. In contrast, when the thickness t between the front and rear surfaces of the obstacle is considered, an extended shade area B appears on the propagation path passing through the corners (1, 2) in a vertical direction of the obstacle. The extended shade area B includes the shade area A.

When the obstacle is modeled as a three-dimensional cuboid, the length l of the wall is a horizontal length of the central section at half of the thickness of the wall. However, one skilled in the art sufficiently understands that the horizontal length of an obstacle can be determined considering the shape of the obstacle simplified according to the modeling method of the obstacle.

Figure 3A:
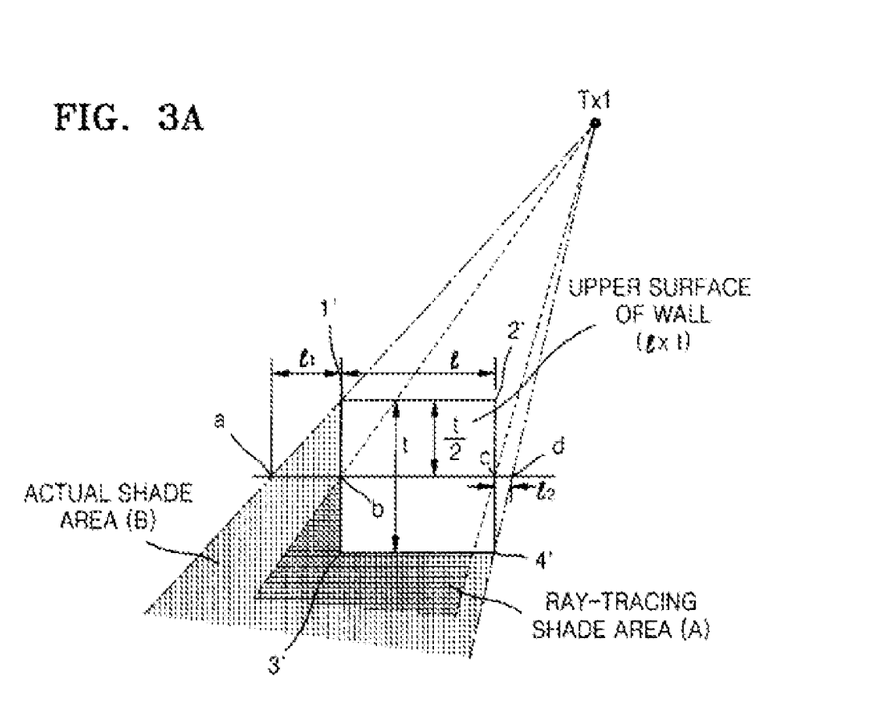
FIGS. 3A, 3B, and 3C are plan views showing an actual shade area generated by the obstacle of FIG. 2 using a ray-tracing method.
Figure 3B:
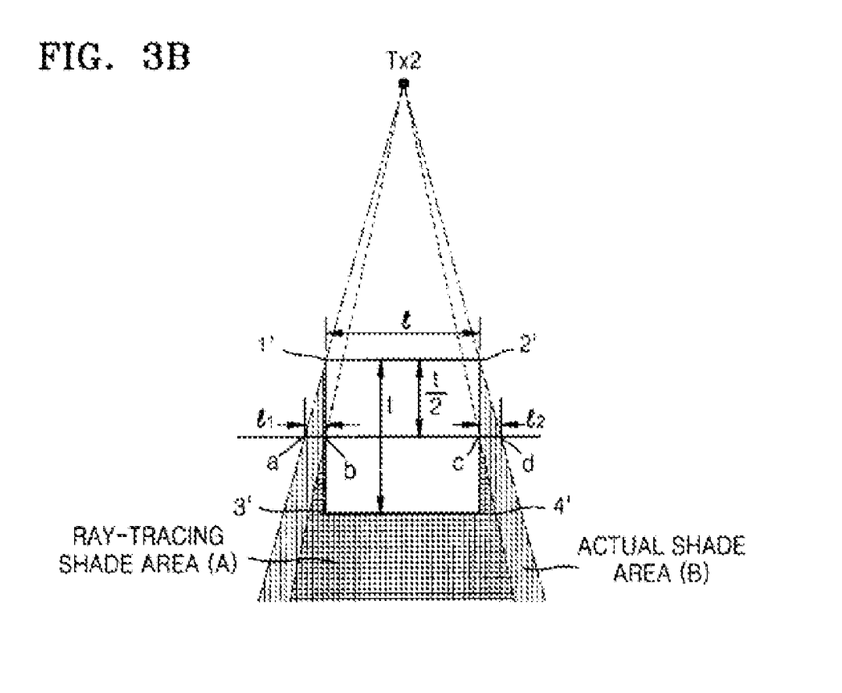
Figure 3C:
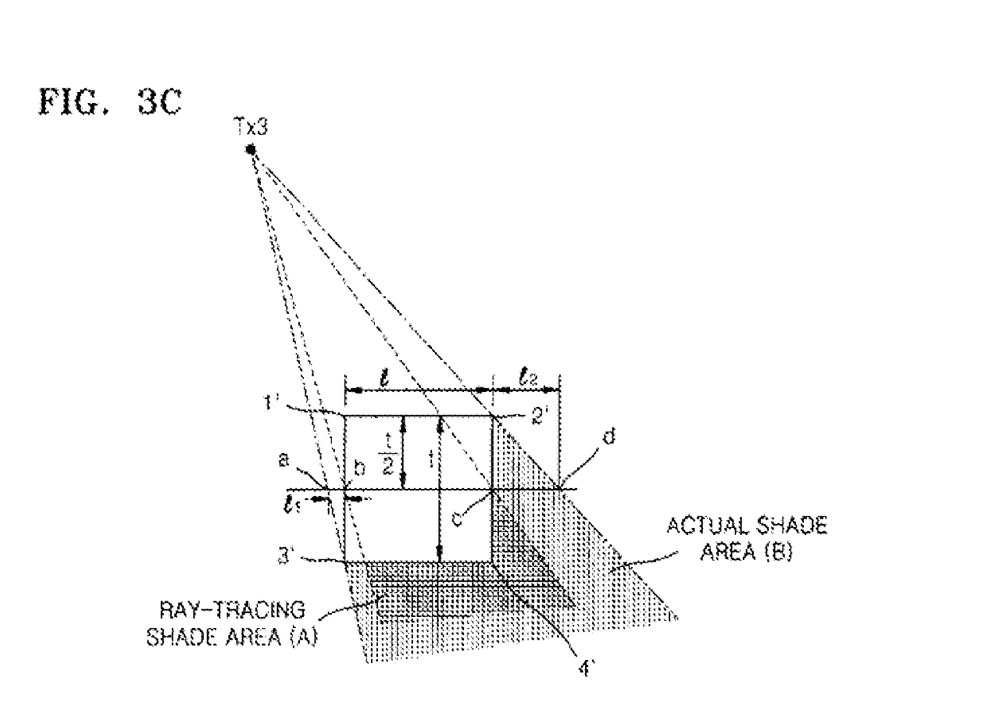

FIGS. 3A-3C are plan views showing an actual shade area B generated using a ray-tracing method considering the thickness t of an obstacle (wall), according to an embodiment of the present invention. In FIGS. 3A-3C, numbers 1'-4' are corners 1'-4' in a vertical direction of the obstacle (the wall) when the corners 1-4 of the obstacle of FIG. 2 are viewed from a top. Referring to FIGS. 3A-3C, as shown in FIG. 2, there is a difference between the ray-tracing shade area A and the actual shade area B due to the thickness of the wall. Also, the difference in the shade areas can vary not only due to the thickness of the obstacle but also due to the relative position between the obstacle and the transmitter.

When a radio wave from a transmitter Tx1 of FIG. 3A meets the obstacle, considering the thickness t, the actual shade area B appears to pass corners 1' and 4' of the obstacle. When a radio wave from a transmitter Tx2 of FIG. 3B meets the obstacle, considering the thickness t, the actual shade area B appears to pass corners 1' and 2' of the obstacle. When a radio wave from a transmitter Tx3 of FIG. 3C meets the obstacle, considering the thickness t, the actual shade area B appears to pass corners 2' and 3' of the obstacle.

The actual shade area B is an extended shade area due to a propagation path passing two selected corners of the four corners in the vertical direction of the obstacle depending on the relative position of the obstacle and the transmitter and the actual shade area B also includes the shade area A. A method of calculating a corrected length l' that is common in the drawings is described below.

As it is shown in each drawing, when the relative position of the transmitter with respect to the obstacle is determined in a radio propagation modeling area, the extended lines ($l_1=\overline{ab}$, $l_2=\overline{cd}$), projecting from the wall in the lengthwise direction of the wall, occurs in addition to the length l of the wall.

Thus, to reflect on the actual shade area B, the length l of the wall is replaced by the corrected length l'. The corrected length l' is $l+l_1+l_2$ and used only to represent the shade area. When the angle respectively between the extended lines ($l_1$ and $l_2$) and the propagation path is $\theta_1$ and $\theta_2$, $l_1$ and $l_2$ can be calculated by the following equations. The angles $\theta_1$ and $\theta_2$ are selected to have a smaller angle from among the angles between the each extended line of the length of the wall and the propagation path.

$$l_1 = \frac{1}{2}\frac{t}{\tan\theta_1} \qquad \text{[Equation 1]}$$

$$l_2 = \frac{1}{2}\frac{t}{\tan\theta_2} \qquad \text{[Equation 2]}$$

Figure 4:
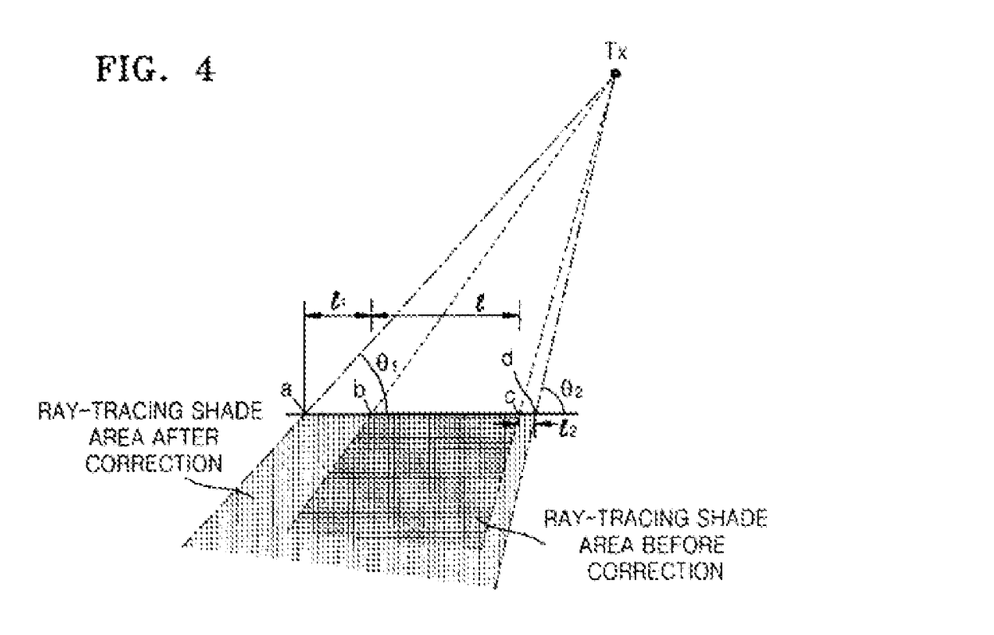
FIG. 4 illustrates the comparison between a shade area according to the conventional ray-tracing method and a shade area according to a ray-tracing method according to an embodiment of the present invention.

FIG. 4 illustrates the comparison between the shade area according to the conventional ray-tracing method and the shade area according to the ray-tracing method according to an embodiment of the present invention, Referring to FIG. 4, the difference from the actual shade area can be minimized by replacing the length l of a wall with a corrected length l ($l'=l+l_1+l_2$) to correct the shade area. Also, the complexity of the ray-tracing method can be avoided by representing the wall with a simple line. The length of the extended lines, $l_1$ and $l_2$, of the corrected length l' can be calculated by Equations 1 and 2.

Figure 5:
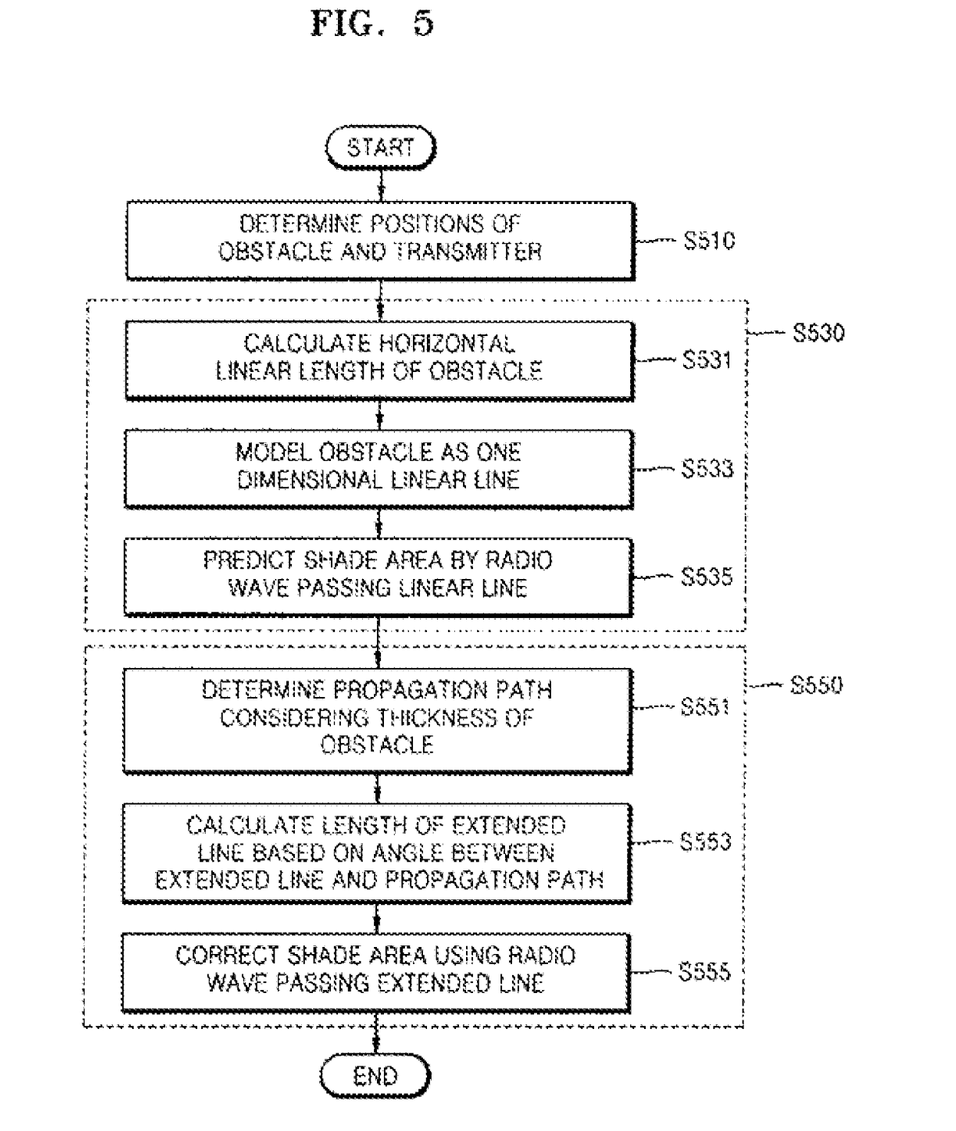
FIG. 5 is a flowchart of a radio propagation modeling method using a ray-tracing method, according to an embodiment of the present invention.

FIG. 5 is a flowchart of a radio propagation modeling method using a ray-tracing method, according to an embodiment of the present invention. Detailed descriptions on the same contents as those described above will be omitted herein.

Referring to FIG. 5, an obstacle in a radio propagation modeling area is recognized and a relative position of a transmitter with respect to the obstacle is determined (S510). As described above, the difference in the shade areas due to the obstacle can vary not only due to the thickness of the obstacle but also depending on the relative position of the transmitter with respect to the obstacle.

Then, a shade area, generated by a radio wave output from the transmitter, is predicted using the horizontal linear length of the obstacle (S530). In detail, the horizontal linear length at the central section of the obstacle is calculated (S531). The obstacle is modeled as a horizontal line, in one dimension, having the horizontal linear length (S533). The shade area, generated by the radio wave output from the transmitter, is predicted using the horizontal line (S535).

Then, the shade area is corrected considering the thickness of the obstacle (S550). In detail, as shown in FIGS. 3A-4, considering the thickness of the obstacle, two of the corners in the vertical direction of the obstacle depending on the relative position of the obstacle and the transmitter are selected and a propagation path passing each of the selected two corners are predicted (S551). The selected corners are the two corners selected from the four corners of the obstacle in the vertical direction such that an extended shade area can include the shade area, that is, the horizontal extended line of the obstacle can include the length (horizontal line) of the obstacle.

The length of the horizontal extended line is calculated based on the angle made between the propagation path and the horizontal extended line at a position where the thickness of the obstacle is half (S553), The length of the extended line can be calculated using Equations 1 and 2. The shade area is corrected to the extended shade area that is generated by the radio wave output from the transmitter and the extended horizontal line (S555).

Figure 6:
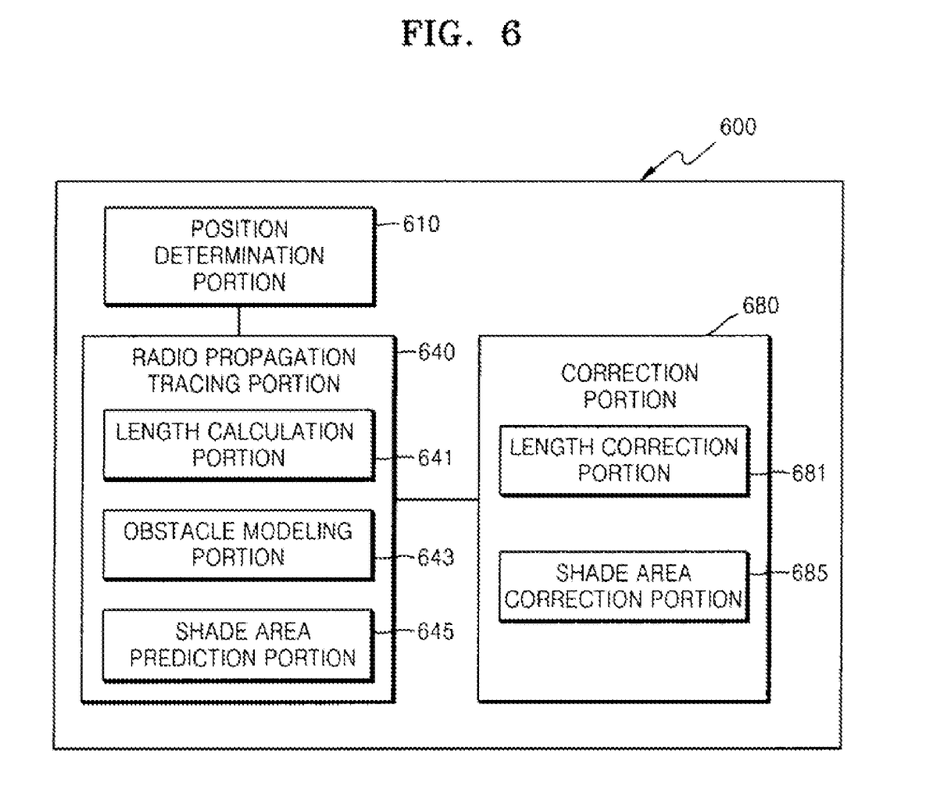
FIG. 6 is a block diagram of a radio propagation modeling apparatus using a ray-tracing method, according to an embodiment of the present invention.

FIG. 6 is a block diagram showing the internal structure of a radio propagation modeling apparatus using a ray-tracing method, according to an embodiment of the present invention. Detailed descriptions on the same contents as those described above will be omitted herein.

Referring to FIG. 6, a radio propagation modeling apparatus 600 includes a position determination portion 610, a radio propagation tracing portion 640, and a correction portion 680. The position determination portion 610 recognizes an obstacle in a radio propagation modeling area and determines a relative position of a transmitter with respect to the obstacle. The radio propagation tracing portion 640 predicts a shade area, generated by a radio wave output from the transmitter and the horizontal linear length at a central section of the obstacle.

The radio propagation tracing portion 640 includes a length calculation portion 641, an obstacle modeling portion 643, and a shade area prediction portion 645. The length calculation portion 641 calculates the horizontal linear length at the central section of the obstacle. The horizontal linear length of the obstacle can be differently calculated according to the shape of the obstacle and/or the obstacle modeling method. The obstacle modeling portion 643 models the obstacle as a horizontal line in one dimension having the horizontal linear length. The shade area prediction portion 645 predicts a shade area, generated by the radio wave output from the transmitter and the horizontal line.

The correction portion 680 corrects the shade area considering the thickness of the obstacle and includes a length correction portion 681 and a shade area correction portion 685. The length correction portion 681 predicts a propagation path passing each of two corners selected from the corners in the vertical direction of the obstacle depending on the relative position of the obstacle and the transmitter and calculates the length of the horizontal extended line, extending from the horizontal line, based on the angle made between the propagation path and the horizontal extended line at a central section of the obstacle where the thickness of the object is half. The two corners of the vertical four corners of the obstacle are selected such that an extended shade area can include the shade area, that is, the horizontal extended line can include the horizontal line. The shade area correction portion 685 corrects the shade area to the extended shade area, generated by the radio wave output from the transmitter and the horizontal extended line.

According to the radio propagation modeling method and apparatus according to the present invention, since the shade area generated by an obstacle when a radio wave is transmitted by a transmitter is approximately close to an actual shade area and simultaneously the obstacle can be modeled as a linear line, accurate modeling is possible.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by one skilled in the art to which the present invention pertains.

The terminologies used in the above description are not used to limit the meaning or restrict the range of the present invention defined in claims.

While this invention has been particularly shown and described with reference to preferred embodiments thereof, it will be understood by one skilled in the art that various changes in form and details may be made therein without departing from the spirit and scope of the invention as defined by the appended claims.

As describe above, in the radio propagation prediction using a ray-tracing method according to the present invention, a shade area can be predicted considering the thickness of a wail to approximate an actual shade area generated by an obstacle. Thus, as compared to conventional technology in which a prediction error is large and calculation using information on the wall is complicated and takes long time, in the present invention, when a shade area is predicted considering the thickness of the wall, the wall can be simply represented as a linear line and thus, the occurrence of errors is much decreased. That is, accurate prediction using the ray-tracing method is possible and the calculation time is not increased.

What is claimed is:

1. A radio propagation modeling method using a ray-tracing method, the radio propagation modeling method comprising:

determining a position of a transmitter with respect to an obstacle in a radio propagation modeling area;

predicting a shade area, generated by a radio wave output from the transmitter, based on a horizontal linear length of the obstacle; and correcting the shade area considering the thickness of the obstacle, wherein the correcting of the shade area comprises:

predicting a propagation path passing each of two corners selected from corners extending in a vertical direction of the obstacle depending on a relative position of the obstacle and the transmitter:

calculating a length of a horizontal extended line, extending from a horizontal line based on an angle made between the propagation path and the horizontal extended line at a position where the thickness of the obstacle is half; and correcting the shade area as an extended shade area, generated by a radio wave output from the transmitter and the horizontal extended line.

2. The method of claim 1, wherein the predicting of a shade area comprises:

calculating a horizontal linear length of a central section of the obstacle;

modeling the obstacle as a horizontal line, in one dimension, having the horizontal linear length; and predicting a shade area, generated by a radio wave output from the transmitter and the horizontal line.

3. The method of claim 1, wherein the two corners are selected from the corners extending in the vertical direction of the obstacle such that the extended shade area includes the shade area, depending on a relative position of the obstacle and the transmitter.

4. A radio propagation modeling apparatus using a ray-tracing method, the apparatus comprising:
   a position determination portion determining a position of a transmitter with respect to an obstacle in a radio propagation modeling area;
   a radio propagation tracing portion predicting a shade area, generated by a radio wave output from the transmitter, based on a horizontal linear length of the obstacle; and
   a correction portion correcting the shade area considering the thickness of the obstacle,
   wherein the correction portion comprises:
   a length correction portion predicting a propagation path passing each of two corners selected from corners extending in a vertical direction of the obstacle depending on a relative position of the obstacle and the transmitter, and calculates a length of a horizontal extended line, extending from the horizontal line, based on an angle made between the propagation path and the horizontal extended where the thickness of the obstacle is half; and
   a shade area correction portion correcting the shade area as an extended shade area, generated by a radio wave output from the transmitter and the horizontal extended line.

5. The apparatus of claim 4, wherein the radio propagation tracing portion comprises:
   a length calculation portion calculating a horizontal linear length of a central section of the obstacle;
   an obstacle modeling portion modeling the obstacle as a horizontal line, in one dimension, having the horizontal linear length; and
   a shade area prediction portion predicting a shade area generated by a radio wave output from the transmitter and the horizontal line.

6. The apparatus of claim 4, wherein the length calculation portion selects the two corners from the corners extending in the vertical direction of the obstacle such that the extended shade area includes the shade area, depending on a relative position of the obstacle and the transmitter.

* * * * *